United States Patent
Hughes et al.

[11] 3,908,013
[45] Sept. 23, 1975

[54] PHARMACEUTICAL AROMATIC GUANIDINE COMPOSITIONS AND METHODS OF USING SAME

[75] Inventors: John Lawrence Hughes; Robert Chung-Huan Liu, both of Kankakee, Ill.

[73] Assignee: Armour Pharmaceutical Company, Phoenix, Ariz.

[22] Filed: Apr. 15, 1974

[21] Appl. No.: 460,815

Related U.S. Application Data
[62] Division of Ser. No. 73,244, Sept. 17, 1970, abandoned.

[52] U.S. Cl. ............... 424/258; 424/263; 424/326; 424/321
[51] Int. Cl.² ............... A61K 31/47; A61K 31/44; A61K 31/155; A61K 31/18
[58] Field of Search ............ 424/258, 263, 326, 321

[56] References Cited
OTHER PUBLICATIONS
Chemical Abstracts, Vol. 47, Column 3923(d).
Chemical Abstracts, Vol. 29, Column 1504(8) 1935.

*Primary Examiner*—Albert T. Meyers
*Assistant Examiner*—Daren M. Stephens
*Attorney, Agent, or Firm*—Richard R. Mybeck

[57] ABSTRACT

Pharmaceutical compositions having biological activity and containing novel aromatic guanidine compounds having the formula:

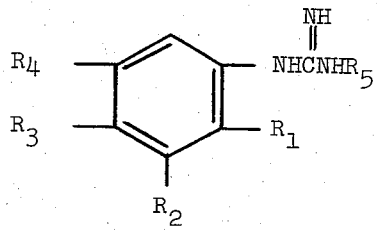

wherein: $R_1$ is hydrogen, alkyl having one to four carbon atoms, or alkoxy having one to four carbon atoms; $R_2$ is hydroxy, hydroxymethyl, alkyl having one to four carbon atoms, alkoxy having one to four carbon atoms, acetyl or methanesulfonamido; or $R_1$ and $R_2$ are joined in a tetramethylene group or a pyrido group; or $R_2$ is hydrogen when $R_1$ is a moiety other than hydrogen; $R_3$ is hydrogen, hydroxy, chloro, bromo, fluoro, alkyl having one to four carbon atoms, or alkoxy having one to four carbon atoms except that when $R_2$ is hydroxy, $R_3$ is also hydroxy and if $R_3$ is chloro, bromo or fluoro, $R_1$ will not be hydrogen; $R_4$ is hydrogen, chloro, bromo, fluoro, alkyl having one to four carbon atoms, or alkoxy having one to four carbon atoms; and $R_5$ is hydrogen or methyl. The guanidine compounds and their salts are shown to be active as vasoconstrictor agents and create useful pharmaceutical preparations when deployed with a pharmaceutically acceptable carrier for administration to a host, e.g., man, requiring vasoconstrictive therapy.

10 Claims, No Drawings

PHARMACEUTICAL AROMATIC GUANIDINE COMPOSITIONS AND METHODS OF USING SAME

RELATED APPLICATION

This application is a divisional from our co-pending U.S. Pat. application Ser. No. 73,244 filed on Sept. 17, 1970 for Novel Compounds and Methods of Using Same, now abandoned.

DESCRIPTION OF THE INVENTION

This invention relates to pharmaceutical compositions containing generally novel chemical compounds and methods of using them to realize the benefits of their novel biological properties. More particularly, this invention relates to compositions containing one or more of a class of novel aromatic guanidine compounds and their corresponding non-toxic acid addition salts which possess vasoconstrictor properties and hence are useful as vasoconstrictor agents.

The class of compounds embraced with the present invention and for which this patent is sought are represented by the structural notation:

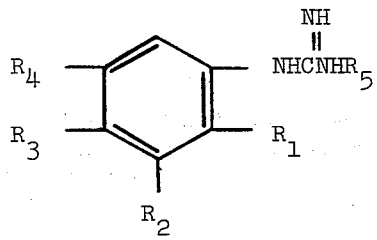

wherein: $R_1$ is hydrogen, alkyl having one to four carbon atoms or alkoxy having one to four carbon atoms; $R_2$ is hydroxy, hydroxymethyl, alkyl having one to four carbon atoms, alkoxy having one to four carbon atoms, acetyl or methanesulfonamido; or $R_1$ and $R_2$ are joined in a tetramethylene group or a pyrido group or $R_2$ is hydrogen when $R_1$ is a moiety other than hydrogen; $R_3$ is hydrogen, hydroxy, chloro, bromo, fluoro, alkyl having one to four carbon atoms or alkoxy having one to four carbon atoms except that when $R_2$ is hydroxy, $R_3$ is also hydroxy and if $R_3$ is chloro, bromo or fluoro, $R_1$ will not be hydrogen; $R_4$ is hydrogen, chloro, bromo, fluor, alkyl having one to four carbon atoms or alkoxy having one to four carbon atoms; and $R_5$ is hydrogen or methyl. The non-toxic acid addition salts of the guanidine compounds are also biologically active. All of the aforesaid compounds and salts are active vasoconstrictor agents.

Representative of compounds suitable for practice of this invention are: 4'-chloro-3',5'-dimethoxyphenylguanidine; 3',4'-dimethylphenylguanidine; 3',4',5'-trimethoxyphenylguanidine; 4'-chloro-o-tolylguanidine; 3'-acetylphenylguanidine; 1-(5',6',7',8'-tetrahydronaphthyl) guanidine; 3'-methanesulfonamidophenylguanidine; 3'-methoxyphenylguanidine; 1-(3', 4'-dihydroxyphenyl)-3-methylguanidine; 3',4'-dihydroxyphenylguanidine; 3',-4'-dimethoxyphenylguanidine; 5'-chloro-o-tolylguanidine; 3'-methanesulfonamido-4'-hydroxyphenylguanidine; 5-(8-hydroxyquinolyl) guanidine; 4'-hydroxy-3'-methylphenylguanidine; and 4'-hydroxy-3'-hydroxymethylphenylguanidine. Representative of the salts embodied in this invention are: 4'-chloro-2',5'-dimethoxyphenylguanidine nitrate; 2',3'-dimethylphenylguanidine nitrate; 3',4',5'-trimethoxyphenylguanidine nitrate; 4'-chloro-o-tolylguanidine hydrochloride; 3'-acetylphenylguanidine hydrochloride; 1-(5',6',7',8'-tetrahydronaphthyl)guanidine hydrochloride; 3'-methanesulfonamidophenylguanidine maleate; 3'-methoxyphenylguanidine citrate; 1-(3',4'-dihydroxyphenyl)-3-methylguanidine hydrochloride; 3',4'-dihydroxyphenylguanidine hydrochloride; 3',4'-dimethoxyphenylguanidine nitrate; 5'-chloro-o-tolylguanidine nitrate; 4'-hydroxy-3'-methanesulfonamidophenylguanidine hydrochloride; 5-(8-hydroxyquinolyl)guanidine hydrochloride; 4'-hydroxy-3'-methylphenylguanidine sulfate; and 4'-hydroxy-3'-hydroxymethylphenylguanidine hydrochloride.

The term "vasoconstrictor agents", as used herein to define the utility of the new compound of this invention, means those agents which are useful to effect the amelioration of congestive states of the eye and nose, and in treatment of shock and other hypotensive states.

Compounds known previously as vasoconstrictor agents, and the basis of current commercial efforts by the pharmaceutical industry are methoxamine, ephedrine, epinephrine, oxymetazoline, phenylephrine, levartenenol, naphazoline and tuaminoheptane.

While these compounds have been successful in providing the desired vasoconstrictive action, they have also been the cause of severe adverse reactions such as cardiac arrhythmias and excessive elevation of blood pressure. Further, such compounds, when employed in topical formulations are known to cause stinging, burning, and the sensation of intense dryness.

The present invention is predicated upon the discovery of new aromatic guanidine compounds and their corresponding non-toxic acid addition salts shown above, which possess remarkably unexpected properties as vasoconstrictor agents and obtain vasoconstrictor activity without any significant changes in the cardiac rate of the host to whom such agents are administered. Further, as will appear, the compounds of this invention may be administered by oral, parenteral and topical routes with but minimal effects on the cardiac rate of the host animal, including man.

Accordingly, one of the prime objects of the present invention is to provide new chemical compounds which are useful.

Another object of the present invention is to provide new compounds which have biological activity and are useful as vasoconstrictor agents.

A further object of the present invention is to provide new aromatic guanidine compounds which, per se, and in the form of the corresponding non-toxic acid addition salts can be employed as vasoconstrictor agents and are free from significant effects on the cardiac rate of the host to whom it is administered.

Still another object of the present invention is to provide new aromatic guanidine compounds and methods of using them which are useful pharmaceuticals in the treatment of hypotensive states, and as nasal and ocular decongestants.

These and still further objects as shall hereinafter appear are fulfilled by the present invention in a remarkably unobvious fashion as will be discerned from the following detailed description and examples of embodiments of this invention.

The aromatic guanidine compounds of the present invention can be prepared by any of several procedures, for example, the addition of hydrogen cyanamide to an aromatic amine (or its mineral acid addition salt); the reaction of a 1-aryl-2-methyl-2-thiopseudourea hydroiodie with ammonia or an alkyl amine and the like.

The guanidines may be converted to their acid addition salts by reacting the guanidine with an appropriate mineral or organic acid such, for example, as hydrochloric acid, sulfuric acid, nitric acid, hydrobromic acid, hydroiodic acid, maleic acid, citric acid, acetic acid, tartaric acid, benzoic acid, propionic acid, carbonic acid, the like acids which are well known to form pharmaceutically acceptable salts so do not need to be belabored here.

One such procedure for preparing the guanidines comprises the mixture of the appropriate aromatic amine mineral acid addition salt (or the aromatic amine with one molar equivalent of the appropriate mineral acid), aqueous 50% cyanamide solution and ethyl alcohol which is then heated at reflux for 3 to 20 hours. For optimum yield the molar ratio of aromatic amine salt, cyanamide, and ethyl alcohol was 1.0:1.5:15 respectively. The products, i.e., the aromatic guanidine mineral acid addition salts, are isolated from the reaction mixtures and purified by recrystallization from an appropriate solvent, i.e., water or aliphatic alcohols. When the acid addition salt could not be purified it was converted to the free base by the addition of an alkali hydroxide and purified by recrystallization from an appropriate solvent.

Another satisfactory method comprises forming a mixture of an appropriate 1-aryl-2-methyl-2-thiopseudourea hydroiodide, an appropriate primary amine and ethyl alcohol. The mixture is heated at reflux for 20 hours. For optimum yield the molar ratio of the thiopseudourea, primary amine and ethyl alcohol was 1:3:15, respectively. The products are isolated from their reaction mixtures and converted to hydrochloride salts for purification and characterization.

Dihydroxy substituted guanidines are prepared by the method comprising the hydrogenolytic debenzylation, in the presence of palladium catalyst, of the corresponding 3′,4′-dibenzyloxyphenylguanidine hydrochloride salts. The reaction procedure is accomplished by agitation of a solution of the benzyloxy compounds in ethyl alcohol in the presence of 5% palladium on powdered charcoal under a hydrogen pressure of 50 psi. The products, after removal of the catalyst, are purified by recrystallization from an appropriate aliphatic alcohol.

A guanidine compound, prepared by either of the foregoing procedures, or by other suitable procedures, may be converted to its acid addition salt, e.g., hydrochloride by the addition of the appropriate acid to the guanidine compound.

The guanidine compounds of this invention may be employed as free bases or in the form of their non-toxic pharmaceutically acceptable salts. Thus, for example, organic and inorganic acid addition salts may be employed, such as the salts of hydrochloric, sulfuric, nitric, phosphoric, citric, acetic, lactic, tartaric, sulfamic, succinic, fumaric, maleic, ethanedisulfonic, hydrobromic, benzoic and similar non-toxic acids. The salts may be prepared by reacting the guanidine base with an excess of acid in a suitable solvent, such as ethanol, acetone, water, or mixture thereof. The mixture is heated to effect solution, and the salts crystallize on cooling.

The guanidines and their salts are administered in therapeutically effective amounts to animals, including man, and in appropriate ways. Thus, dosage of about 1 milligram to 5 milligrams per kilogram of host body weight, may be provided to man by systemic administration, e.g., orally or parenterally. The compounds may be administered systemically to animals other than man in dosages of up to about 5 milligrams per kilogram of body weight. The foregoing and other dosage levels herein are based on the content of guanidine base. The compounds have excellent vasoconstriction, a low order of toxicity, and relatively few observed side effects.

In the preferred embodiments of the invention, an aromatic guanidine or a salt thereof is administered in a pharmaceutical composition which includes the guanidine compound and a pharmaceutical carrier. The carrier is a non-toxic pharmaceutical grade substance, which may be either solid or liquid. Suitable solid carriers include lactose, magnesium stearate, starch, sucrose, mannitol, sorbitol, cellulose powder, dicalcium phosphate, talc, stearic acid, gelatin, agar pectin, acacia and the like. Suitable liquid carriers include glycols, polyglycols, dimethylsulfoxide, peanut oil, olive oil, sesame oil, alcohols, water, and the like. If desired, the carrier may include a time delay material such as glycerol monostearate, or glycerol di-stearate, alone or with a wax.

The composition preferably is provided in unit dosage form for accuracy and convenience in administration. Where appropriate, oral administration is effective and preferred, and dosage units suitable for oral administration are provided. Examples of such dosage units employing solid carriers include tablets, filled capsules, packets and the like, and lozenges. The amount of solid carrier per dosage unit may vary widely, preferably from about 25 milligrams to 5 gram.

The guanidines and their salts may be compounded with semi-solid and liquid carriers in solutions, suspensions, emulsions, ointments, suppositories and soft gelatin capsules, for example. Such compositions may be administered pancavally, i.e., via natural and artificial openings in the body, such as the mouth, the anus, the vagina, the nares, and the stoma of colostomy patients, intravenously or intramuscularly, employing the appropriate composition having a suitable concentration of active ingredient according to the desired route of administration.

The foregoing dosage forms are prepared by conventional procedures of mixing, granulating, compressing, suspending and/or dissolving, as is suitable to prepare the desired dosage form.

The vasoconstriction of a host animal, including man, which has a condition requiring such treatment is readily obtained by administering to the afflicted host an aromatic guanidine or a pharmaceutically acceptable acid addition salt thereof in an amount sufficient to alleviate the symptoms of the condition. The usual symptoms requiring treatment are low blood pressure, ocular and nasla congenstion, and the like.

The compound preferably is administered at the dosage level described above and preferably in a pharmaceutical carrier. The dosage level and frequency of administration are to a certain extent subjective, attention being given to the degree of vasoconstriction or decongestion, the case history, the reaction of the subject, and the like.

The daily dosage can be administered in one or more parts and the administration can be accomplished pancavally or parenterally or topically. Administration for the provision of systemic vasoconstriction is preferably oral and is most conveniently accomplished by means of a tablet containing one of the active compounds and a pharmaceutical carrier. For local vasoconstriction, that is, eyes, nose, etc., topical administration is preferred.

We have obtained especially good results when administering to the animal organism the following aromatic guanidines to obtain vasoconstriction therein. The guanidines so used are: 4'-chloro-3',5'-dimethoxyphenylguanidine; 3',4'-dimethylphenylquanidine; 3',4',5'-trimethoxyphenylguanidine; 4'-chloro-o-tolylguanidine; 3'-acetylphenylguanidine; 1-(5', 6',7',8'-tetrahydronaphthyl)guanidine; 3'-methanesulfonamidophenylguanidine; 3'-methoxyphenylguanidine; 1-(3',4'-dihydroxyphenyl)-3-methylguanidine; 3',4'-dihydroxyphenylguanidine; 3',4'-dimethoxyphenylguanidine; 5'-chloro-o-tolylguanidine; 3'-methanesulfonamido-4'-hydroxyphenylguanidine; 5-(8-hydroxyquinolyl)guanidine; 4'-hydroxy-3'-methylphenylguanidine; and 4'-chloro-2',5'-dimethoxyphenylguanidine nitrate; 2',3'-dimethylphenylguanidine nitrate; 3',4',5'-trimethoxyphenylguanidine nitrate; 4'-chloro-o-tolylguanidine hydrochloride; 3'-acetylphenylguanidine hydrochloride; 1-(5',6',7',8'-tetrahydronaphthyl)guanidine hydrochloride; 3'-methanesulfonamidophenylguanidine maleate; 3'-methoxyphenylguanidine citrate; 1-(3',4'-dihydroxyphenyl)-3-methylguanidine hydrochloride; 3',4'-dihydroxyphenylguanidine hydrochloride; 3',4'-dimethoxyphenylguanidine nitrate; 5'-chloro-o-tolylguanidine nitrate; 4'-hydroxy-3'-methanesulfonamidophenylguanidine hydrochloride; 5-(8-hydroxyquinolyl)guanidine hydrochloride; 4'-hydroxy-3'-methylphenylguanidine sulfate; and 4'-hydroxy-3'-hydroxymethylphenylguanidine hydrochloride.

The onset of activity after oral administration in the animal organism is rapid, results being observed within one-half hour, and the activity is sustained. Thus, the activity levels remain high for two or more hours, and activity persists over a 24-hour period. After topical or intravenous administration the onset of action is rapid and persists for one or more hours.

Of the aromatic guanidines which may be employed to produce vasoconstriction or decongestion, those having meta and/or para substitution appear to provide most desirable results.

The following examples are illustrative of the preparation of the novel guanidines of the invention, new pharmaceutical compositions embodying said guanidines and their non-toxic acid addition salts, the treatment of the animal organism in accordance with the invention, and the activities exhibited in such treatment. It is to be understood that the invention is not limited to the examples or to the compounds, compositions, proportions, conditions, and methods set forth therein, which are only illustrative. Throughout the examples, the specific guanidines enumerated have been used to typify the entire class of compounds and compositions of the invention.

EXAMPLE I

4'-Chloro-2',5'-dimethoxyphenylguanidine nitrate was prepared from a mixture of 18.8g (0.1 mole) of 4-chloro-2,5-dimethoxyaniline, 9.0g of concentrated nitric acid (equivalent to 0.1 mole of $HNO_3$), 12.6g of a 50 percent aqueous cyanamide solution (equivalent to 0.15 mole of cyanamide) and 100 ml of ethyl alcohol. The mixture was heated at reflux for 20 hours and the reaction mixture was then cooled to 0°C and held there for 5 hours. The precipitated solid was collected on a filter and then purified by recrystallization from water. The purified white crystalline product melted at 101°C (dec.). The infrared spectrum was consistent with the assigned structure.

Analysis: Calcd. for $C_9H_{13}ClN_4O_5$: C, 36.93; H, 4.48; Cl, 12.12; N, 19.15.

Found: C, 37.12; H, 4.85; Cl, 12.24; N, 18.78.

EXAMPLE II 2,3'-Dimethylphenylguanidine nitrate was prepared using the product isolation procedures of Example I except that in the reaction 2',3'-dimethylaniline replaced the 4-chloro-2, 5-dimethoxyaniline. The isolated product was recrystallized from methyl alcohol. The purified white crystalline solid melted at 225C°(dec.) and its infrared spectrum was consistent with the assigned structure.

Analysis: Calcd. for $C_9H_{14}N_4O_3$: C, 47.78; H, 6.24; N, 24.77.

Found: C, 47.58; H, 6.37; N, 24.53.

EXAMPLE III

3',4',5'-Trimethoxyphenylguanidine nitrate was prepared using the reaction and product isolation procedures of Example I except that 3,4,5-trimethoxyaniline was used in place of the 4-chloro-2,5-dimethoxyaniline. The isolated product was recrystallized from methyl alcohol and the purified white crystalline compound melted at 198°–200°C (dec.). The infrared spectrum was consistent with the assigned structure.

Analysis: Calcd. for $C_{10}H_{16}N_4O_6$: C, 41.66; H, 5.59; N, 19.44.

Found: C, 41.67; H, 5.58; N, 19.56.

EXAMPLE IV

4'-Chloro-o-tolyguanidine hydrochloride was prepared from a mixture of 14.1g (0.1 mole) of 4-chloro-2-methylaniline, 10g of concentrated hydrochloric acid (equivalent to 0.1 mole of HCl), 12.6g of a 50 percent aqueous cyanamide solution (equivalent to 0.15 mole of cyanimide), and 100 ml of ethyl alcohol. The mixture was heated at reflux for 3 hours. The reaction mixture was evaporated to a thick residue. This residue was triturated with ether. After decanting the ether, the crude product was recrystallized from isopropyl alcohol and the purified white crystalline product melted at 198°–201°C. The infrared spectrum was consistent with the assigned structure.

Analysis: Calcd. for $C_8H_{11}Cl_2N_3$: C, 43.67; H, 5.04; Cl, 32.33; N, 19.10

Found: C, 43.71; H, 4.73; Cl, 32.45; N, 18.98.

EXAMPLE V

3'-Acetylphenylguanidine hydrochloride was prepared from a mixture of 13.5 (0.1 mole) of 3-aminoacetophenone, 10 g of concentrated hydrochloric acid (equivalent to 0.1 mole of HCl), 12.6g of a 50 percent aqueous cyanamide solution (equivalent to 0.15 mole of cyanamide), and 100 ml of ethyl alcohol. The mixture was heated at reflux for 20 hours. The reaction mixture was evaporated and the residual oil was dissolved in hot acetone. This acetone-oil solution was then cooled at 0°C for 16 hours and filtered. The filtrate was evaporated and the residual solid recrystallized from ispropyl alcohol and acetone in a 3:1 ratio. The white crystalline product melted at 152°–4°C. The infrared spectrum was consistent with the assigned structure.

Analysis: Calcd. for $C_9H_{12}ClN_3O$: C, 50.49; H, 5.66; Cl, 16.59; N, 19.67.

Found: C, 50.76; H, 5.71; Cl, 16.55; N, 19.46.

EXAMPLE VI

1'-(5',6',7',8'-Tetrahydronaphthyl)guanidine hydrochloride was prepared using the reaction procedure of Example V except that 1-amino-5,6,7,8-tetrahydronaphthalene was used in place of the 3-aminoacetophenone. The product was isolated from the reaction mixture by evaporation of the reaction solvent and trituration of the residual oil with acetone. After decanting the acetone the product was purified by recrystallization from ispropyl alcohol. The white crystalline solid melted at 218°–20°C. The infrared spectrum was consistent with the assigned structure.

Analysis: Calcd. for $C_{11}H_{16}ClN_3$: C, 58.53; H, 7.15; N, 18.62.

Found: C, 58.78; H, 7.35; N, 18.52.

EXAMPLE VII

3'-Methanesulfonamidophenylguanidine was prepared from a mixture of 22.3 g (0.1 mole) of 3-aminomethanesulfonanilide hydrochloride, 12.6 g of a 50 percent aqueous cyanamide solution (equivalent to 0.15 mole of cyanamide) and 100 ml of ethyl alcohol. The mixture was heated at reflux temperature for 20 hours. The solvent was then evaporated and the residue was dissolved in water to which 8.4 g (0.1 mole) of sodium bicarbonate was added. The mixture was cooled for 5 hours at 0°C. The precipitated solid was collected on a filter and purified by recrystallization from water. The white crystalline solid melted at 241°–3°C (dec.). The infrared spectrum was consistent with the assigned structure.

Analysis: Calcd. for $C_8H_{12}O_2S$: C, 42.09; H, 5.30; N, 24.55; S, 14.04.

Found: C, 42.35; H, 5.53; N, 24.53; S, 14.12.

EXAMPLE VIII

3'-Methoxyphenylguanidine was prepared using the reaction procedure of Example V except that m-anisidine was used in place of 3-aminoacetophenone. The reaction mixture was evaporated to a thick residue. This residue was dissolved in water and aqueous 10 N sodium hydroxide solution was added until the pH was 12. The precipitated product was collected on a filter and recrystallized consecutively from water and isopropyl alcohol. The white crystalline product melted at 151°–3°C. The infrared spectrum was consistent with the assigned structure.

Analysis: Calcd. for $C_8H_{11}N_3O$: C, 58.16; H, 6.71; N, 25.44.

Found: C, 58.10; H, 6.78; N, 25.29.

EXAMPLE IX 1-(3',4'-Dibenzyloxyphenyl)-3-methylguanidine hydrochloride was prepared from a mixture of 60.6 g (0.1 mole) of 1-(3,4-dibenzyloxyphenyl)-2-methyl-2-thiopseudourea hydroiodide, 20 g of aqueous 40 percent methylamine solution (equivalent to 0.65 mole of methylamine), and 250 ml of ethyl alcohol. The mixture was heated at reflux for 20 hours. The reaction mixture was then evaporated to dryness and the residue mixed with 250 ml of water and 40 ml of 10N sodium hydroxide solution. This mixture was extracted with 500 ml of benzene. The benzene layer was evaporated to a viscous residue. This residue was next dissolved in 250 ml of acetone and a solution of hydrogen chloride in ether was added to precipitate the hydrochloride salt of 1-(3',4'-dibenzyloxyphenyl)-3-methylguanidine. This salt after collection and recrystallization from acetone and ether (2:1 ratio) melted at 158°–60°C.

Analysis: Calcd. for $C_{22}H_{24}ClN_3O_2$: C, 66.40; H, 6.08; Cl, 8.91; N, 10.56.

Found: C, 66.20; H, 6.12; Cl, 9.02; N, 10.76.

EXAMPLE X 1-(3',4'-Dihydroxyphenyl)-3-methylguanidine hydrochloride is prepared from a mixture of 28 g (0.07 mole) of the 1-(3', 4'-dibenzyloxyphenyl)-3-methylguanidine hydrochloride (prepared in Example IX), 1.0 g of 5 percent palladium on charcoal, and 250 ml of ethyl alcohol. The mixture was shaken under an initial hydrogen pressure of 50 psi and, after 4 hours of agitation, the reaction mixture was filtered and the filtrate evaporated to a thick residue which solidified after standing 2 hours. This solid was purified by recrystallization from a mixture of ethyl alcohol and ether (3:2 ratio). The resulting white crystalline solid melted at 185°–8°C and the infrared spectrum was consistent with the assigned structure.

Analysis: Calcd. for $C_8H_{12}ClN_3O_2$: C, 44.12; H, 5.56; Cl, 16.28; N, 19.30.

Found: C, 44.07; H, 5.64; Cl, 16.50; N, 19.42.

EXAMPLE XI

3',4'-Dibenzyloxyphenylguanidine is prepared using the reaction procedure of Example VII except that 34 g of 3,4-dibenzyloxyaniline hydrochloride was used in place of the 22.3 g of 3-aminomethanesulfonanilide hydrochloride. This reaction mixture was evaporated to a viscous residue. The residue was mixed with 300 ml of water and then the mixture made basic (pH about 10) by the addition of aqueous 10N sodium hydroxide solution. The mixture was cooled at 0°C for 6 hours and the precipitated solid was collected on a filter. This solid was purified by consecutive recrystallizations, first from aqueous 60% methyl alcohol and finally from benzene. The white crystalline solid melted at 138°–9°C. The infrared spectrum was consistent with the structure of the 3',4'-dibenzyloxyphenylguanidine.

Analysis: Calcd. for $C_{12}H_{21}N_3O_2$: C, 72.60; H, 6.09; N, 12.10.

Found: C, 72.60; H, 6.24; N, 12.22.

EXAMPLE XII

3',4'-Dihydroxyphenylguanidine hydrochloride was prepared from a mixture of 24.4 g (0.07 mole) of 3',4'-dibenzyloxyphenylguanidine, 6.9 g of concentrated hydrochloric acid (equivalent to 0.07 mole hydrogen chloride), 250 ml of ethyl alcohol, and 10 g of 5 percent palladium on charcoal. The mixture was shaken under an initial hydrogen pressure of 50 psi for 4 hours and then the reaction mixture was filtered and the filtrate evaporated to a thick residue. This residue was then dissolved in a 1:1 mixture of isopropyl alcohol and cyclohexane. The solution was cooled at 0°C for 24 hours. The precipitated solid, collected on a filter and dried, melted at 156°–8°C. The infrared spectrum was consistent with the assigned structure for 3',4'-dihydroxyphenylguanidine hydrochloride.

Analysis: Calcd. for $C_7H_{10}ClN_3O_2$: C, 41.29; H, 4.95; Cl, 17.41; N, 20.64.

Found: C, 41.51; H, 4.99; Cl, 17.21; N, 20.68.

EXAMPLE XIII

5'-Chloro-o-tolylguanidine nitrate was prepared using the reaction procedure of Example IV except that 5-chloro-2-methylaniline was used in place of the 4-chloro-2-methylaniline. The product was isolated by removing the reaction solvents by evaporation, dissolving the residue in water, and adding excess sodium nitrate to the solution. After cooling for 5 hours at 0°C, the crude product precipitated from this solution and, after filtration and drying, was recrystallized from isopropyl alcohol. The pure product melted at 185°–7°C. The infrared spectrum was consistent with the assigned structure.

Analysis: Calcd. for $C_8H_{11}ClN_4O_3$: C, 38.95; H, 4.49; Cl, 14.38; N, 22.71.

Found: C, 38.87; H 4.40; Cl, 14.10; N, 22.75.

EXAMPLE XIV

4'-Hydroxy-3'-methanesulfonamidophenylguanidine hydrochloride was prepared using the reaction procedure of Example VII except that 5-amino-2-hydroxymethanesulfonanilide hydrochloride was used in place of the 3-aminomethanesulfonanilide hydrochloride. The reaction mixture was cooled for 5 hours at 0°C and the precipitated solid collected on a filter. The product was purified by recrystallization from water. The infrared spectrum was consistent with the assigned structure.

Analysis: Calcd. for $C_8H_{13}ClN_4O_3S$: C, 34.22; H, 4.68; Cl, 12.63; N, 19.96; S, 11.42.

Found: C, 34.15; H, 4.77; Cl, 12.80; N, 20.03; S, 11.32.

EXAMPLE XV 5-(8-Hydroxyquinolyl) guanidine hydrochloride was prepared using the reaction procedure of Example IV except that 5-amino-8-hydroxyquinoline was used in place of the 4-chloro-2-methylaniline. The reaction mixture was evaporated to a dark brown residue and this residue was dissolved in hot methyl alcohol and cooled at 0°C for 5 hours. The solid obtained after filtration was recrystallized from methyl alcohol. The purified product was a white crystalline solid melting at 310°–2°C. The infrared spectrum was consistent with the assigned structure.

Analysis: Calcd. for $C_{10}H_{11}ClN_4O$: C, 50.32; H, 4.65; Cl, 14.85; N, 23.47.

Found: C, 50.22; H, 4.60;

, 14.82; N, 23.42.

EXAMPLE XVI

4-Hydroxy-3-methylphenylguanidine sulfate was prepared from a mixture of 34.4 g (0.1 mole) of 4-hydroxy-3-methylaniline sulfate, 12.6 g of a 50 percent aqueous cyanamide solution (equivalent to 0.15 mole of cyanamide) and 100 ml of ethyl alcohol. The mixture was heated at reflux for 20 hours and the reaction mixture was cooled at 0°C for 5 hours and filtered. The collected solid was purified by recrystallization from aqueous 75 percent ethyl alcohol. The white crystalline solid melted at 268°–70°C (dec.). The infrared spectrum was consistent with the assigned structure.

Analysis: Calcd. for $C_{16}H_{24}N_6O_6S$: C, 44.85; H, 5.65; N, 1962; S, 7.48.

Found: C, 44.95; H, 5.57; N, 1961; S, 7.48.

EXAMPLE XVII

4'-Hydroxy-3'-hydroxymethylphenylguanidine hydrochloride was prepared using the reaction procedure of Example VII except 4-hydroxy-e-hydroxymethylaniline hydrochloride was used in place of the 3-aminomethanesulfonanilde hydrochloride. The reactions mixture was evaporated to a viscous residue which was triturated with 1:1 mixture of isopropyl alcohol and ethyl acetate. The residual solid was purified by recrystallization from a 1:1 mixture of isopropyl alcohol and ether. The purified yellow crystalline solid melted at 157°–9°C (dec.). The infrared spectrum was consistent with the assigned structure.

Analysis: Calcd. for $C_8H_{12}ClN_3O_2$: C, 44.15; H, 5.56; N, 19.31.

Found: C, 44.12; H, 5.67; N, 19.10.

EXAMPLE XVIII

3',4'-Dimethoxythenylquanidine nitrate was prepared using the reaction procedure of Example I except that 4-aminoveratrole was used in place of the 4-chloro-2,5-dimethoxyaniline. The product was isolated by cooling the reaction mixture for 6 hours at 0°C. The product was then purified by recrystallization from water and the white crystalline product melted at 137°–8°C. The infrared spectrum of the product was consistent with the assigned structure.

Analysis: Calcd. for $C_9H_{14}N_4O_5$: C, 41.86; H, 5.46; N, 21.70.

Found: C, 41.92; H, 5.60; N, 21.49.

EXAMPLE XIX

The following are examples of several dosage forms useful in the practice of the present invention using oral administration.

| FORMULATION "A" Ingredient | Parts |
| --- | --- |
| Guanidine Compound | 60 – 300 |
| Calcium Carbonate | 300 |
| Citric Acid (anhydrous) | 290 |
| Magnesium Carbonate | 129 |

| FORMULATION "B" Ingredient | Parts |
| --- | --- |
| Guanidine Compound | 60 – 300 |
| Citric Acid (anhydrous) | 1000 |
| Sodium Bicarbonate | 2000 |
| Monocalcium Phosphate | 200 |

| FORMULATION "C" Ingredient | Parts |
| --- | --- |
| Guanidine Compound | 60 – 300 |
| Corn Starch | 25 – 50 |
| Lactose | 25 – 2000 |
| Magnesium Stearate | 1 – 5 |

| FORMULATION "D" Ingredient | Parts |
| --- | --- |
| Guanidine Compound | 60 – 300 |

-Continued

FORMULATION "A"

| Ingredient | Parts |
| --- | --- |
| Corn Starch | 25 – 50 |
| Lactose | 25 – 200 |
| Talc | 10 – 50 |
| Silica (powdered) | 0.1 – 2 |

FORMULATION "E"

| Ingredient | Parts |
| --- | --- |
| Guanidine Compound | 60 – 30 |
| Lactose | 65 – 190 |
| Cellulose | 10 – 135 |
| Magnesium Stearate | 0.1 – 5 |

FORMULATION "F"

| Ingredient | Parts |
| --- | --- |
| Guanidine Compound | 60 – 300 |
| Cellulose | 15 – 200 |
| Corn Starch | 10 – 50 |
| Gelatin | 5 – 35 |
| Stearic Acid | 15 |

FORMULATION "G"

| Ingredient | Parts |
| --- | --- |
| Guanidine Compound | 60 – 300 |
| Tricalcium Phosphate | 50 – 150 |
| Corn Starch | 10 – 50 |
| Acacia | 5 – 25 |
| Magnesium Stearate | 1 – 5 |

In each instance, the ingredients in the proportions idicated are milled to a uniform powder, sized, mixed with binder and compressed into tablets.

EXAMPLE XX

Suppositories melting at about 60°F and each having the following composition are produced by compounding the ingredients in the relative proportions indicated and heating the ingredients to about 60°F to effect a solution. The solution is then poured into cooled molds and allowed to cool and solidify.

| Ingredient | Amount |
| --- | --- |
| Guanidine Compound | 0.1 to 1.0 mg |
| Base of lactose, polyethylene glycol, polyethylene glycol 400, polyethylene glycol 4000, polysorbate 80 and glycerine | 1 gram |

EXAMPLE XXI

A glosset for sublingual administration was prepared using 60 to 300 mg of guanidine compound disposed in a rapidly disintegrating base formed of starch, lactose, sodium saccharin and talcum.

EXAMPLE XXII

The ingredients of the following compositions were compounded to provide a solution suitable for intravenous administration. In each instance, the ingredients were mixed and warmed to about 50°–60°C with stirring to effect solution. The solution was then sterile filtered, cooled to room temperature, and packaged in sterile vials.

FORMULATION "H"

| Ingredient | Amount |
| --- | --- |
| Guanidine Compound | 10 – 500 mg |
| Sodium Chloride | 890 mg |
| Water | 99 g |

FORMULATION "I"

| Ingredient | Amount |
| --- | --- |
| Guanidine Compound | 10 – 500 mg |
| Glucose | 5 g |
| Water | 95 g |

EXAMPLE XXIII

The ingredients of the following compositions were compounded to provide a solution suitable for intramuscular and subcutaneous formulation administration. In each instance, the ingredients were mixed and warmed to about 50°–60°C with stirring to effect solution. The solution was then sterile filtered, cooled at room temperature, and packaged in sterile vials.

FORMULATION "J"

| Ingredient | Amount |
| --- | --- |
| Guanidine Compound | 10 – 500 mg |
| 16% Aqueous Gelatin Containing 0.5% Phenol | 100 g |

FORMULATION "K"

| Ingredient | Amount |
| --- | --- |
| Guanidine Compound | 10 – 500 mg |
| Sodium Chloride | 890 g |
| Water | 99 g |

FORMULATION "L"

| Ingredient | Amount |
| --- | --- |
| Guanidine Compound | 10 – 5000 mg |
| Glucose | 5 g |
| Water | 95 g |

FORMULATION "M"

| Ingredient | Amount |
| --- | --- |
| Guanidine Compound | 10 – 500 mg |
| 10–90% Aqueous Polyethylene Glycol 400 | 100 g |

EXAMPLE XXIV

The guanidine compound is dispersed in a cream vehicle consisting of a water-miscible base of stearic acid, propylene glycol, sorbitol monostearate and monooleate, polyoxyethylene sorbitan monostearate with citric acid and methyl and propyl parabens as preservatives. Concentration of the guanidine compound is 0.1 to 50 mg per gram of vehicle.

Alternately, the guanidine compound may be dispersed in corn oil, sesame oil, cotton seed oil, peanut oil, or polyethylene glycols with the addition of appropriate preservatives.

EXAMPLE XXV

The vasoconstrictor properties of several representative compounds of this invention were determined pharmacologically using accepted methodology. The hear rate changes anesthetized dogs who received an intravenous dosage of a guanidine compound as indicated. Throughout the procedure, host blood pressure was monitored by means of indwelling arterial catheter connected to a pressure transducer, host heart rate was determined from the limb electrocardiogram, and cartoid arterial blood flow was continuously monitored with a flow probe around the artery which probe was connected to an electromagnetic flow meter. It will be noted that three standard vasoconstrictors, all current commercial products, were also assayed in this manner and provide a reference base. The test compounds are coded in Table I and the data is reported in subsequent tables below.

TABLE I

| Test Compound Code | Chemical Name |
|---|---|
| A | 4'-Chloro-2',5'-dimethoxyphenyl guanidine nitrate |
| B | 3',4'-Dimethylphenyl guanidine nitrate |
| C | 3',4',5'-Trimethoxyphenyl guanidine nitrate |
| D | 4'-Chloro-o-tolyl guanidine hydrochloride |
| E | 3'-Acetylphenyl guanidine hydrochloride |
| F | 1-(5',6',7',8'-Tetrahydronaphthyl)-guanidine hydrochloride |
| G | 3'-Methanesulfonamidophenyl guanidine |
| H | 3'-Acetylphenyl guanidine |
| I | 1-(3',4'-Dihydroxyphenyl)-3-methyl guanidine hydrochloride |
| J | 3',4'-Dihydroxyphenyl guanidine hydrochloride |
| K | 3',4'-Dimethoxyphenyl guanidine nitrate |
| L | 5'-Chloro-o-tolyl guanidine nitrate |
| M | 3'-Methanesulfonamido-4'-hydroxyphenyl guanidine hydrochloride |
| N | 5-(8-Hydroxyquinolyl) guanidine hydrochloride |
| O | 4'-Hydroxy-m-tolyl guanidine sulfate |
| P | 4'-Hydroxy-3'-hydroxymethyl phenyl guanidine hydrochloride |

TABLE II

Heart Rate Changes in Anesthetized Dogs

| Test Compound | Dose (mg/Kg.i.v.) | | |
|---|---|---|---|
| | 0.01 | 0.1 | 1.0 |
| A | | − | 0 |
| B | 0 | − | + |
| C | | 0 | − |
| D | 0 | 0 | 0 |
| E | 0 | 0 | − |
| F | 0 | − | − |
| G | | − | − |
| H | 0 | − | − |
| I | 0 | + | + |
| J | − | − | + |
| K | 0 | 0 | − |
| L | 0 | 0 | − |
| M | − | − | − |
| N | − | − | − |
| O | 0 | − | − |
| P | 0 | − | − |
| Naphazoline | − | − | + |
| Phenylephrine | | + | + |
| Phenylpropanolamine | 0 | + | − |

Rating Scale:  − Decrease in heart rate
0 No change in heart rate
+ Increase in heart rate

EXAMPLE XXVI

Additional data was obtained for each representative compound by measuring the rise in means arterial blood pressure after intravenous administration to an anesthetized dog.

The scale employed to evaluate the results is shown in Table III, and the test data is recorded in Table IV, using the code for test compounds set forth in Table I of Example XX.

TABLE III

| Activity Rating | Pressure Rise in mm Hg |
|---|---|
| 0 | 0 – 3 |
| 1 | 4 – 10 |
| 2 | 11 – 25 |
| 3 | 26 – 50 |
| 4 | 51 – 75 |
| | 75 |

TABLE IV

Activity Rating for Test Compounds

| Test Compound | Dose (mg/Kg.i.v.) | | |
|---|---|---|---|
| | 0.0 | 0.1 | 1.0 |
| A | 0 | 1 | 1 |
| B | 0 | 1 | 2 |
| C | 0 | 1 | 3 |
| D | 0 | 2 | 4 |
| E | 0 | 0 | 3 |
| F | 0 | 2 | 3 |
| G | 0 | 0 | 1 |
| H | 0 | 1 | 2 |
| I | 0 | 3 | 5 |
| J | 2 | 3 | 5 |
| K | 0 | 0 | 3 |
| L | 0 | 2 | 3 |
| M | 2 | 3 | 4 |
| N | 1 | 4 | 5 |
| O | 1 | 3 | 5 |
| P | 3 | 4 | 5 |
| Naphazoline | 3 | 4 | 4 |
| Phenylephrine | 3 | 5 | 5 |
| Phenylpropanolamine | 0 | 3 | 5 |

EXAMPLE XXVII

An aqueous solution was prepared containing 3',4'-dihydroxyphenylguanidine hydrochloride and suitable for use with the nose and eyes to effect decongestion of the mucous membranes of these organs. The solution was stable, physiologically isotonic and had a pH in the range of 6 to 7.

The formulation is shown below. The sodium phosphate salts comprise a buffer system to maintain the pH at about 6.5 and sodium bisulfate is used as an antioxidant. Sodium chloride provides the desired isotonicity and thimersol as a preservative which protects the solution from bacterial and mold contamination.

| FORMULATION "N" Ingredient | Wt. % |
|---|---|
| 3',4'-Dihydroxyphenylguanidine hydrochloride | 2.00 |
| Monbasic sodium phosphate | 0.10 |
| Dibasic sodium phosphate | 0.12 |
| Sodium bisulfite | 0.20 |
| Sodium chloride | 0.15 |
| Merthiolate sodium (Thimerosal) | 0.01 |
| Water | 97.42 |

From the foregoing, it becomes apparent that the invention herein described and illustrated fulfills all of our objectives, express and implied, in a remarkably unexpected fashion and that we have developed new and useful compounds, pharmaceutical compositions and therapeutic methods for providing vasoconstriction in hosts requiring such therapy.

What is claimed is:

1. A pharmaceutical composition having vasoconstrictive activity consisting of a pharmaceutical grade carrier and a vasoconstricting amount of (an) a non-toxic aromatic guanidine compound having the formula:

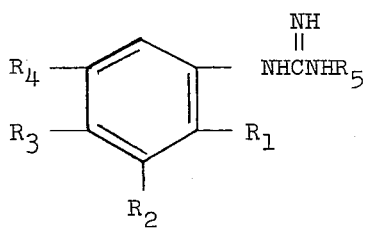

wherein: $R_1$ is hydrogen, alkyl having one to four carbon atoms, or alkoxy having one to four carbon atoms; $R_2$ is hydroxy, hydroxymethyl, alkyl having one to four carbon atoms, alkoxy having one to four carbon atoms, acetyl or methanesulfonamido; or $R_1$ and $R_2$ are joined in a tetramethylene group or a pyrido group; or (R) $R_2$ is hydrogen when $R_1$ is a moiety other than hydrogen; $R_3$ is hydrogen, hydroxy, chloro, bromo, fluoro, alkyl having one to four carbon atoms, or alkoxy having one to four carbon atoms except that when $R_2$ is hydroxy, $R_3$ is also hydroxy and if R is chloro, bromo or fluoro, $R_1$ will not be hydrogen; $R_4$ is hydrogen, chloro, bromo, fluoro, alkyl having one to four carbon atoms, or alkoxy having one to four carbon atoms; and $R_5$ is hydrogen or methyl; or a non-toxic acid addition salt thereof.

2. A composition according to claim 1 wherein said addition salt is 3',4'-dihydroxyphenylguanidine hydrochloride.

3. A composition according to claim 1 wherein said addition salt is 3'-methanesulfonamido-4'-hydroxyphenylguanidine hydrochloride.

4. A composition according to claim 1 wherein said addition salt is 5-(8-hydroxyquinolyl)guanidine hydrochloride.

5. A composition according to claim 1 wherein said addition salt is 4'-hydroxy-m-tolylguanidine sulfate.

6. A composition according to claim 1 wherein said addition salt is 4'-hydroxy-3'-hydroxymethylphenylguanidine hydrochloride.

7. A pharmaceutical composition according to claim 1 in a dosage unit form selected from the group consisting of tablets, filled capsules, packets, lozenges, glossets, sterile solutions, suspensions, emulsions, ointments, suppositories and soft gelatin capsules.

8. A pharmaceutical composition according to claim 2 in which said carrier is a sterile solution.

9. The method of treating an animal host including man which host requires vasoconstriction comprising administering to said host an effective vasoconstricting amount of the composition according to claim 1.

10. The method of claim 9 comprising administering to said host from about 1 mg to about 5 mg of said guanidine compound per kilogram of host body weight.

* * * * *

UNITED STATES PATENT OFFICE
CERTIFICATE OF CORRECTION

PATENT NO. : 3,908,013
DATED : September 23, 1975
INVENTOR(S) : John Lawrence Hughes; Robert Chung-Huan Liu It is certified that error appears in the above-identified patent and that said Letters Patent are hereby corrected as shown below:

Claim 1, line 3, delete "(an)";

line 12, delete "(R)"; and line 17, correct "R" to read ---$R_3$---.

Signed and Sealed this

Twenty-seventh Day of July 1976

[SEAL]

Attest:

RUTH C. MASON
Attesting Officer

C. MARSHALL DANN
Commissioner of Patents and Trademarks